United States Patent
Bender et al.

(10) Patent No.: US 9,940,089 B2
(45) Date of Patent: Apr. 10, 2018

(54) VEHICLE INFORMATION DISPLAY AND MANAGEMENT

(71) Applicant: International Business Machines Corporation, Armonk, NY (US)

(72) Inventors: Michael Bender, Rye Brook, NY (US); Santosh S. Borse, Ossining, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/252,446

(22) Filed: Aug. 31, 2016

(65) Prior Publication Data

US 2018/0060008 A1 Mar. 1, 2018

(51) Int. Cl.

| G06F 3/147 | (2006.01) |
|---|---|
| G06F 17/30 | (2006.01) |
| G06F 21/04 | (2006.01) |
| B60K 35/00 | (2006.01) |
| G09G 3/20 | (2006.01) |
| G06Q 30/00 | (2012.01) |
| G09F 21/04 | (2006.01) |
| G06F 1/16 | (2006.01) |

(52) U.S. Cl.
CPC .............. *G06F 3/147* (2013.01); *B60K 35/00* (2013.01); *G06F 17/30011* (2013.01); *G06F 17/30991* (2013.01); *G06Q 30/018* (2013.01); *G09F 21/04* (2013.01); *G09G 3/2096* (2013.01); *B60K 2350/1076* (2013.01); *B60K 2350/2052* (2013.01); *G06F 1/1652* (2013.01)

(58) Field of Classification Search
None
See application file for complete search history.

(56) References Cited

U.S. PATENT DOCUMENTS

| 4,184,276 A | 1/1980 | Hernandez |
|---|---|---|
| 5,463,827 A | 11/1995 | Williams |
| 6,026,060 A | 2/2000 | Rothschild et al. |
| 6,641,038 B2 | 11/2003 | Gehlot et al. |
| 6,868,313 B2 | 3/2005 | Koljonen |

(Continued)

OTHER PUBLICATIONS

DMV, "Compare Auto Insurance Rates and Save—DMV.com Exclusive", https://www.dmv.com/blog/digital-license-plates-to-reduce-DMV-costs- . . . , Updated Mar. 2, 2015, 2 pages.
WPXI, "Vehicle registration stickers will be a thing of the past in Pa.", http://www.wpxi.com/news/vehicle-registration-stickers-will-be-a-thing-o . . . , Copyright 2016 Cox Media Group, 6 pages, Feb. 2016.

(Continued)

*Primary Examiner* — Joni Richer
(74) *Attorney, Agent, or Firm* — John R. Pivnichny; Madeline F. Schiesser; Keohane & D'Alessandro, PLLC

(57) ABSTRACT

Approaches presented herein include an electronic, programmable vehicle window display device and a method of managing the same. Specifically, an electronic, programmable vehicle window display device is provided for displaying a registration or other vehicle information in a window of a vehicle. The device displays a vehicle information document having an expiration date. The device, at pre-specified times, queries a vehicle database for an updated version of the document having a later expiration date. If an updated document is found, the device retrieves the updated document and saves the updated document in a storage area of the device. The device then modifies the display to show the updated document.

20 Claims, 5 Drawing Sheets

(56) References Cited

U.S. PATENT DOCUMENTS

| | | | |
|---|---|---|---|
| 7,551,088 B2 | 6/2009 | Findlay et al. | |
| 9,007,193 B2 | 4/2015 | Boston et al. | |
| 2002/0021210 A1* | 2/2002 | Naddeo | B60Q 1/56 340/425.5 |
| 2002/0135466 A1* | 9/2002 | Bunyan | B60R 25/24 340/426.1 |
| 2003/0112242 A1* | 6/2003 | Vitale | B60Q 1/56 345/440 |
| 2004/0134410 A1* | 7/2004 | Tal | B60Q 1/50 116/28 R |
| 2006/0213100 A1 | 9/2006 | McCann | |
| 2008/0051996 A1* | 2/2008 | Dunning | B60Q 1/503 701/431 |
| 2008/0258938 A1 | 10/2008 | Moon | |
| 2009/0113775 A1* | 5/2009 | Netter | G06Q 30/02 40/591 |
| 2009/0173783 A1* | 7/2009 | Fomitchev | G06Q 20/04 235/380 |
| 2012/0022781 A1* | 1/2012 | Wilson | G01C 21/3469 701/410 |
| 2015/0194082 A1 | 7/2015 | McEwan | |

OTHER PUBLICATIONS

Ron Miller, "IBM Launches Quarks Open Source Development Tool to Build Efficient IoT Apps", http://techcrunch.com/2016/02/15/ibm-launches-quarks-open-source-dev . . . , Copyright 2013-2016 AOL Inc., 8 pages, Feb. 2016.

* cited by examiner

VEHICLE INFORMATION DISPLAY AND MANAGEMENT

TECHNICAL FIELD

This invention relates generally to an electronic display for a vehicle and, more specifically, to providing information related to a vehicle on an electronic display mounted on the vehicle.

BACKGROUND

Entities such as governments, universities, businesses, and so on, often require vehicle owners to have a sticker or paper identifier affixed to their vehicle's windshield or to another prominent location on the vehicle. These stickers generally act as proof of a paid registration or an entitlement to drive on public or private roads, park in reserved parking lots, or enter a particular location. In many places, vehicle registration and other vehicle permits often require a periodic (e.g., annual or biennial) renewal. This renewal process can often be inconvenient and wasteful, creating pain points for vehicle owners, entities issuing registration stickers or other permit stickers, and entities enforcing registration validity.

SUMMARY

In general, embodiments described herein provide for an electronic, programmable vehicle window display device and a method of managing the same. Specifically, an electronic, programmable vehicle window display device is provided for displaying a registration or other vehicle information in a window of a vehicle. The device displays a vehicle information document having an expiration date. The device, at pre-specified times, queries a vehicle database for an updated version of the document having a later expiration date. If an updated document is found, the device retrieves the updated document and saves the updated document in a storage area of the device. The device then modifies the display to show the updated document.

One aspect of the present invention includes a method of managing a programmable vehicle window display device, the method comprising: displaying a first vehicle information document on a display of the programmable vehicle window display device, the first vehicle information document having a first validity end date; querying a vehicle information database for a second vehicle information document having a second validity end date subsequent to the first validity end date; retrieving, responsive to the second validity end date being subsequent to the first validity end date, the second vehicle information document; saving the second vehicle information document in a storage area of the programmable vehicle window display device; and displaying the second vehicle information document on the display.

Another aspect of the present invention includes a computer system for managing a programmable vehicle window display device, the computer system comprising: the programmable vehicle window display device, comprising: a memory medium comprising program instructions; a bus coupled to the memory medium; and a processor for executing the program instructions comprising a vehicle window display engine, the instructions causing the system to: display a first vehicle information document on a display of the programmable vehicle window display device, the first vehicle information document having a first validity end date; query a vehicle information database for a second vehicle information document having a second validity end date subsequent to the first validity end date; retrieve, responsive to the second validity end date being subsequent to the first validity end date, the second vehicle information document; save the second vehicle information document in a storage area of the programmable vehicle window display device; and display the second vehicle information document on the display.

Yet another aspect of the present invention includes a computer program product for managing a programmable vehicle window display device, the computer program product comprising a computer readable hardware storage device, and program instructions stored on the computer readable hardware storage device, to: display a first vehicle information document on a display of the programmable vehicle window display device, the first vehicle information document having a first validity end date; query a vehicle information database for a second vehicle information document having a second validity end date subsequent to the first validity end date; retrieve, responsive to the second validity end date being subsequent to the first validity end date, the second vehicle information document; save the second vehicle information document in a storage area of the programmable vehicle window display device; and display the second vehicle information document on the display.

Yet still another aspect of the present invention includes a method for managing a programmable vehicle window display device, comprising: providing a computer infrastructure that includes at least one computer device, the computer device operating to perform the steps of: displaying a first vehicle information document on a display of the programmable vehicle window display device, the first vehicle information document having a first validity end date; querying a vehicle information database for a second vehicle information document having a second validity end date subsequent to the first validity end date; retrieving, responsive to the second validity end date being subsequent to the first validity end date, the second vehicle information document; saving the second vehicle information document in a storage area of the programmable vehicle window display device; and displaying the second vehicle information document on the display.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
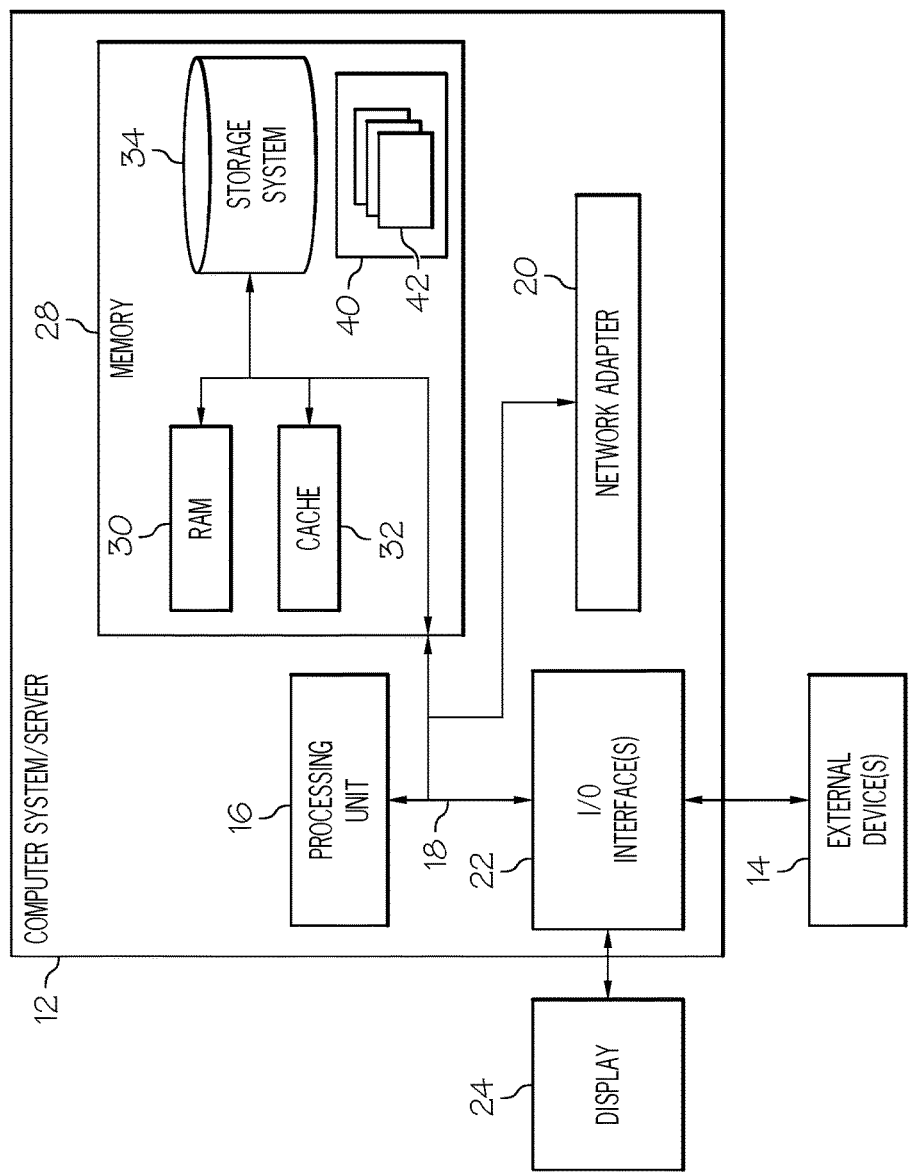
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

It should be understood that the term "vehicle," as used herein, refers to any device used for transportation and which is registered with a registering authority. Accordingly, "vehicle" can refer to, but is not limited to, an automobile, such as a car or a truck; a recreational vehicle, such as a golf cart, an all-terrain vehicle (ATV), a snowmobile, a motorcycle, or a bicycle; a public transportation vehicle, such as a bus or a train; an aquatic vehicle, such as a boat or submersible; an air vehicle, such as an airplane or helicopter; or so forth.

It should further be understood that the terms "register" and "registration," as used herein, refer to any registration of a vehicle with an authority, and are not limited to, but can include, a state/region/community/government or Department of Motor Vehicles (DMV) issued vehicle registration.

As stated above, embodiments described herein provide for an electronic, programmable vehicle window display device and a method of managing the same. Specifically, an electronic, programmable vehicle window display device is provided for displaying a registration, vehicle credential, or other vehicle information in a window of a vehicle. The device displays a vehicle information document having an expiration date. The device, at pre-specified times, queries a vehicle database for an updated version of the document having a later expiration date. If an updated document is found, the device retrieves the updated document and saves the updated document in a storage area of the device. The device then modifies the display to show the updated document.

Referring now to FIG. 1, a computerized implementation 10 of an embodiment for managing an electronic vehicle window display device will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for managing an electronic vehicle window display device. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for managing an electronic vehicle window display device, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that current methods of vehicle registration used by entities such as governments, universities, businesses, etc., suffer from numerous pain points and limitations. Such entities often require a vehicle owner to have a sticker or paper identifier affixed to the windshield of the owner's vehicle or to another prominent location on the vehicle. These stickers generally act as proof of a paid registration or an entitlement to drive on public or private roads, park in reserved parking lots, or enter a particular location. In many places, vehicle registration and other vehicle permits often require a periodic (e.g., annual or biennial) renewal. This renewal process can often be inconvenient and wasteful for vehicle owners, entities issuing registrations, and entities enforcing registration validity.

For example, generally a vehicle owner must apply for a registration renewal, yet the owner may easily forget to do so. Further, vehicle registrations are usually in the form of a sticker and/or a paper card, which must be manufactured and printed with accompanying documentation, resulting in costs, material waste, and manufacturing and transportation pollution. These stickers and/or paper cards must further be mailed to each vehicle owner, adding further costs and a risk of being lost in the mail. The process for removing a registration sticker or other adhesive sticker is often difficult, as old stickers can leave adhesive residue that can obstruct the view of new sticker and cause injuries from attempts to remove it with an edged tool. Moreover, when a new sticker or paper card is placed on a vehicle windshield, it can be difficult to perfectly overlap where the previous sticker was, which further obscures the view of the new sticker when placed adjacent to previous residue. Furthermore, many entities, such as governments, require a vehicle owner to carry additional documentation somewhere in the vehicle. Additionally, entities enforcing registration validity may have difficulty viewing a registration sticker or card at night, and require a flashlight if the surrounding area is dark. Furthermore, vehicle registration and validation can be made more complex where linked or related to other processes, such as inspections, unpaid fines, and insurance coverage.

Embodiments of the present invention provide several advantages for addressing the above pain points and limitations of current methods of vehicle registration. In particular, embodiments of the present invention offer an easily adopted, cost-effective solution to providing vehicle registration documentation that decreases the burden on vehicle owners, entities issuing registrations, and entities enforcing registration validity. More specifically, embodiments of the present invention include a device and a communication update technique of the device, which are capable of replacing vehicle registration windshield stickers with an electronic display panel that can be managed remotely without the need or cost to send replacement registration stickers upon expiration. Embodiments of the present invention may be used by registration/permit issuing entities including, but not limited to, a state's Department of Motor Vehicles (DMV), parks, and parking lots/structures.

Figure 2:
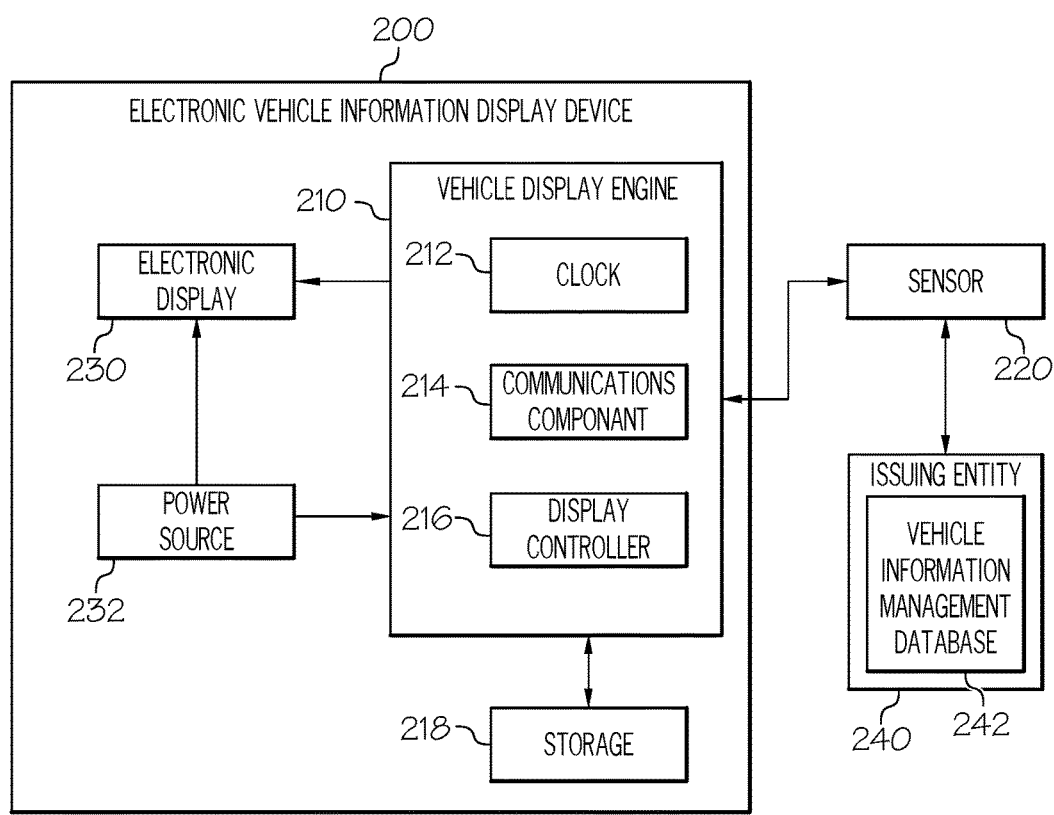
FIG. 2 shows a more detailed system architecture for an electronic vehicle information window display device according to illustrative embodiments.

Referring now to FIG. 2, a more detailed system architecture for an electronic/programmable vehicle information window display device 200 according to illustrative embodiments is shown. Electronic vehicle information window display device 200 can contain a vehicle window display engine 210 containing program instructions for carrying out embodiments of the present invention. In some embodiments, vehicle window display engine 210 can be program/utility 40 of FIG. 1 and electronic vehicle information window display device 200 can be computer system 12 of FIG. 1. Vehicle window display engine 210 can contain a set of components for carrying out embodiments of the present invention, including clock 212, communications component 214, and display controller 216. Electronic vehicle information window display device 200 can further contain, and vehicle window display engine 210 can further be in communication with, storage 218, sensor 220, electronic display 230, and power source 232. Vehicle window display engine 210 can further be in communication with an issuing entity 240 having database 242 of vehicle registration records.

Figure 3:
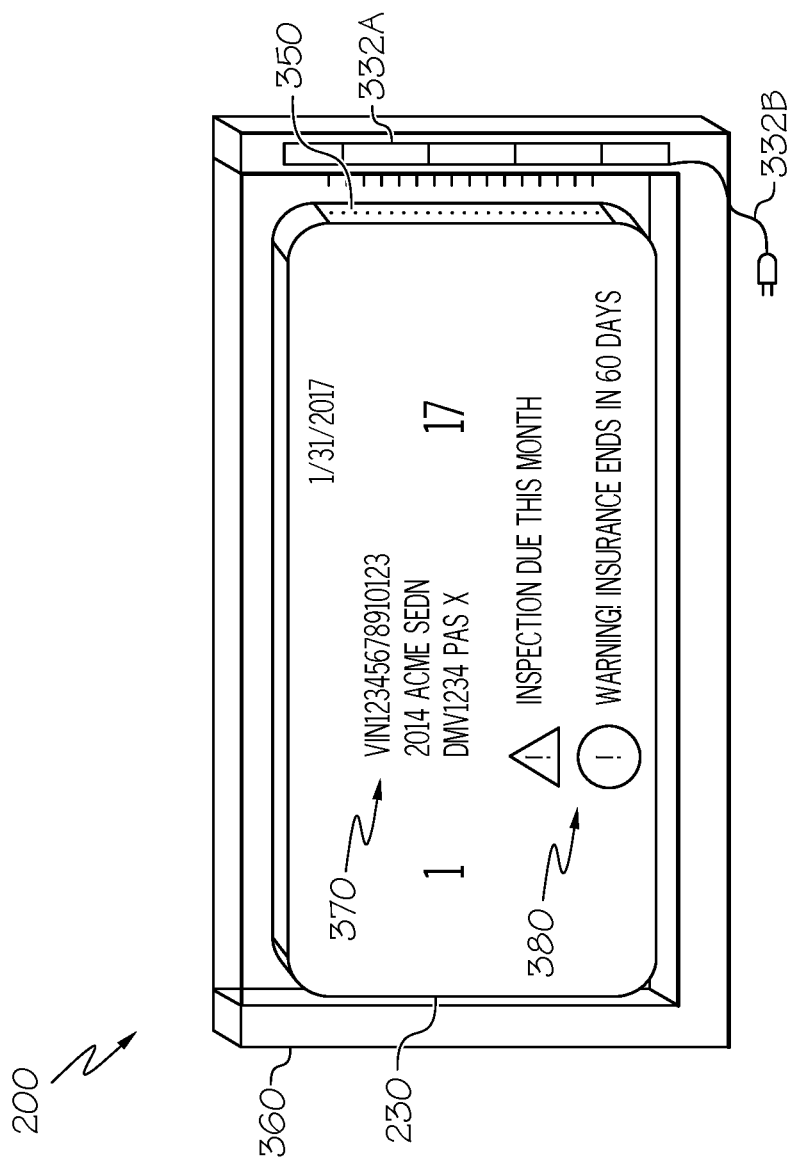
FIG. 3 shows an example vehicle information window display device according to illustrative embodiments.

Referring now to FIG. 3, an embodiment of electronic vehicle information window display device 200 (see FIG. 2) is shown. Electronic vehicle registration window display device 200 can be device with electronic display 230 that displays vehicle information 370. In some embodiments, electronic vehicle registration window display device 200 can be a thin device, with a sufficiently narrow thickness to be attached to a vehicle windshield without interfering with operation of the vehicle or blocking a view through the windshield (e.g., less than 1 inch in thickness). Electronic vehicle registration window display device 200 can further contain or be connected with electronic dock connector 350, windshield attachment mechanism 360, and a power source (e.g., power source 332A and/or 332B).

In some embodiments, electronic display 230 of electronic vehicle information window display device 200 can be made of a flexible screen containing electronics, such as a Light Emitting Diode (LED). In some embodiments, the screen can be of sufficiently flexible to be capable of flexing to match a curvature of a windshield. Furthermore, electronic display 230 can mimic an appearance of a vehicle information/registration sticker issued by issuing authorities. For example, electronic display 230 can have the same or similar dimensions to those of a traditional vehicle registration sticker and can display the same or similar vehicle information 370 as a traditional vehicle registration sticker. In a further example, vehicle information 370 may include a vehicle identification number (VIN), a registration plate number and/or expiration date, a year/make/model of a vehicle, and/or a barcode or Quick Response (QR) code. In some embodiments, a displayed barcode or QR code may contain one or more items of vehicle information 370, such as those listed above, an/or a link to any vehicle information 370. Moreover, electronic display 230 can contain additional vehicle information 370 not traditionally found on a vehicle registration sticker, such as warnings related to a payment or an inspection required within a defined timeframe.

In some embodiments, electronic vehicle information window display device 200 can be seated in attachment mechanism 360 connected (e.g., by a permanent or semi-permanent attachment fastener, such as adhesive or hook-and-loop material, respectively) to a vehicle (e.g., on a vehicle windshield). One example of attachment mechanism 360 is a fitted skeleton case attached to a vehicle windshield or other vehicle location and configured to nest electronic vehicle information window display device 200 within itself. Another example of attachment mechanism 360 is a pouch or pocket attached to a vehicle windshield or other vehicle location in which electronic vehicle information window display device 200 can sit. In still another example, attachment mechanism 360 can be an attachment fastener directly fastening electronic vehicle information window display device 200 to a windshield or other vehicle location. It should be understood that these example attachment mechanisms 360 are not intended to be limiting, and that electronic vehicle information window display device 200 can be attached to a vehicle using any type of attachment mechanism now known or later developed.

Electronic vehicle information window display device 200 can be powered by any means now known or later developed, including, but not limited to, solar panel 332A, batteries, wired connection 332B to an electrical system of a vehicle through dock connector 350, or wireless power (e.g., inductive charging using an electromagnetic field to transfer energy to display device 200). In some embodiments, linkage to a vehicle or driver can be enhanced to dissuade tampering or theft by electronic display 230 displaying a VIN of the vehicle or an image of a driver's license of the driver or by attachment of electronic vehicle information window display device 200 to a "black box" or power system of the vehicle. Furthermore, electronic vehicle information window display device 200 can be configured such that removal from a vehicle power system, attachment mechanism 360, or the vehicle itself, can trigger a reset to prevent theft or sharing. In some embodiments, electronic vehicle information window display device 200 can detect a removal, for example, by sensing a disconnection from an electrical circuit, an interruption of communication with a system of a vehicle, a disconnection from attachment mechanism 360, or so forth.

Figure 4:
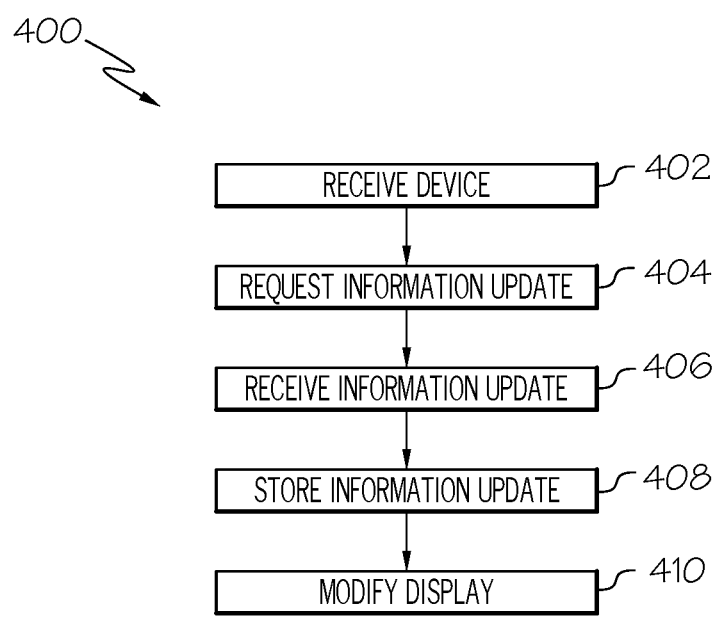
FIG. 4 shows a process flowchart depicting a method of managing an electronic vehicle information window display device according to illustrative embodiments.

Referring now to FIG. 4, with reference to FIG. 2 and FIG. 3, a method 400 of managing electronic vehicle information window display device 200 will be discussed in greater detail. At 402, an owner/user of a vehicle may receive electronic vehicle information window display device 200 from an issuing authority (e.g., a state's DMV, a park, or a parking area). Alternatively, an owner/user of a vehicle may purchase or obtain electronic vehicle information window display device 200 from a third-party seller or provider (e.g., a mechanic's garage, or an auto parts shop) and opt-in to a program for using electronic vehicle information window display device 200. When an owner/user obtains electronic vehicle information window display device 200, it can be preset with a set of information/data including a vehicle identifier (e.g., a VIN) and a first registration expiration date. In some other embodiments, electronic vehicle information window display device 200 may not be preset with a set of information/data, and can instead obtain vehicle information in the process described below.

At step 404, responsive to a time threshold being met on clock 212, communications component 214 of vehicle window display engine 210 requests a set of updated information from vehicle information management database 242. In one embodiment, a time threshold (e.g., 1 month, 2 weeks) of clock 212 can be preset prior to a registration expiration date (e.g., automatically or by a vehicle owner/user or a device issuing entity). Communications component 214 can broadcast the request at an interval, with the broadcast including a vehicle identifier and a current registration expiration date. In some embodiments, this broadcast can be received at sensor 220, which can further transmit via a network (e.g., the Internet) the request for updated information to issuing entity 240 having vehicle information management database 242. In some embodiments, sensor 220 may be a component of a cellular telephone or other personal electronic device of the vehicle user/owner containing an application associated with electronic vehicle information window display device 200. Communications between communications component 214 and vehicle information management database 242 may also be accomplished in a number of ways, such as over a cellular network or a wireless network. In some embodiments, issuing entity 240 can supply a vehicle owner/user with a code or password to increase security.

In some embodiments, when a time threshold is met on clock 212 (e.g., a predetermined time, such as a month before an expiration), communications component 214 can send a notification (e.g., text, email, in-application) to a personal device (e.g., a smart phone running an application associated with electronic vehicle information window display device 200) of a user. This notification can provide information about an expiring vehicle information item (e.g., a description/name, an issuing authority, and/or an expiration date of the vehicle information item) stored on electronic vehicle information window display device 200. The notification can further include information and/or instructions for renewing the expiring vehicle information. For example, the notification can provide contact information, a link, or a direction to a webpage or other location (e.g., the application associated with electronic vehicle information window display device 200) for renewing the expiring vehicle information. In another embodiment, a user may link a financial institution (e.g., a bank, a credit card authority) to a user account of the user and/or to an application on a personal device of the user associated with electronic vehicle information window display device 200. The user can further configure the user account or personal device to charge/debit funds from the financial institution to renew the vehicle information. The user account or personal device can be further configured to charge/debit funds at the prompt of a user, such as a user responding to an expiration notification with an approval to renew the vehicle information item with a requisite fee, or automatically, such as in response to electronic vehicle information window display device 200 registering that an expiration date is approaching. Once the vehicle information has been renewed, communications component 214 of vehicle window display engine 210 can request the renewed vehicle information item from vehicle information management database 242 or the renewed vehicle information item can be pushed to electronic vehicle information window display device 200.

At step 406, communications component 214 receives the set of updated information. At vehicle information management database 242, the request for updated information, containing a vehicle identifier or user identifier and a first expiration date, is processed. The current/first expiration date is compared to a second registration expiration date associated with the vehicle identifier stored in vehicle information management database 242. If the first registration expiration date is unequal to or prior to the second, vehicle information management database 242 transmits a set of updated information containing at least a new registration expiration date (i.e. the second registration expiration date) to communications component 214. This transmission can be through sensor 220 or by another means, such as a wireless network.

At step 408, vehicle window display engine 210 can store the set of updated information in storage 218 of electronic vehicle information window display device 200. Based on the stored set of updated information, display controller 216 can modify electronic display 230 with the second registration expiration date at step 410.

In still further embodiments, electronic vehicle information window display device 200 can be used to display status changes related to past and/or upcoming events (e.g. linking vehicle inspection to registration, payments, insurance). A part of electronic display 230 can provide additional information 380 to a vehicle owner or to a registration enforcement entity. In some embodiments, display controller 216 can configure electronic display 230 to display a warning (e.g., related to a required registration payment or an inspection required in a defined timeframe). This can be accomplished by communications component 214 requesting a status update from vehicle information management database 242, which can include, but is not limited to, a database of a registration issuing entity, a state DMV database, or an insurance company database. If a reply to the request for a status update contains new information, or if an event date (such as an expiration) is within a predetermined threshold, vehicle window display engine 210 can notify a user/owner of the vehicle. In some embodiments, this notification can be in the form of a flashing or brightly colored (e.g., yellow or red) icon or warning 380 on the display or, in other embodiments, display 230 or a boarder around display 230, can light up (e.g., yellow or red to indicate an approaching expiration). In still other embodiments, the notification can be, based on user selection, another form of notification, such as an email or text message.

In another embodiment, electronic vehicle information window display device 200 can provide real-time updates to a registration status of a vehicle. This would prevent a vehicle user/owner from having a seemingly valid registration sticker on the vehicle after a registration of the user/owner has been suspended (e.g., due to lack of insurance coverage, legal prohibition of the owner, or failure to comply with a safety equipment repair). This can be accomplished by communications component 214, at regular intervals (e.g., daily, hourly), requesting a status update from vehicle information management database 242. Initially, vehicle window display engine 210 may be configured to allow a predetermined number of days to fix a problem (e.g., a 10 day warning before an inspection expires). Electronic vehicle information window display device 200 can further be configured to ensure that communications between issuing entity 240 or vehicle information management database 242 and electronic vehicle information window display device 200 are not interrupted. This can be accomplished by requiring that electronic vehicle information window display device 200 make contact with issuing entity 240 or vehicle information management database 242 at regular intervals or within a predefined time window. If this contact is not made, or has not been made after a predetermined set of cycles, electronic vehicle information window display device 200 can be configured to cease displaying vehicle information 370. In any case, responsive to a status update reply indicating that a registration has been revoked or terminated, or to a failure to communicate with issuing entity 240, display controller 216 can configure electronic display 230 to cease displaying vehicle information 370 or to display an indicator, such as a red light or "X" through revoked or terminated information 370, showing that the information is out of date.

In yet another embodiment, electronic vehicle information window display device 200 can be configured to prevent tampering, accidental or intentional, and theft. For example, electronic dock connector 350 and windshield attachment mechanism 360 can have a particular pin combination between the two, so that an electronic vehicle information window display device 200 meant for one base cannot be easily fitted in another base. For example, a pin or key can be stored on a memory of both electronic vehicle information window display device 200 and attachment mechanism 360, such that electronic vehicle information window display device 200 will not function unless attachment mechanism 360 has a matching key. In another example, electronic dock connector 350 can be configured to have a specific shape, like a key, which can only be inserted in and function with an attachment mechanism 360 having a complimentary shape.

In another example, windshield attachment mechanism 360 and/or electronic vehicle information window display device 200 can be configured to prevent removal, by preventing a windshield attachment mechanism 360 and/or electronic vehicle information window display device 200 removed from a vehicle from being fitted in another. For instance, windshield attachment mechanism 360 can have a one-time attachment to a vehicle windshield, such as a permanent or single-use adhesive. In another instance, windshield attachment mechanism 360 can be configured to break if removal is attempted. In yet another instance, electronic vehicle information window display device 200 can be in electrical communication with a car alarm device of a vehicle, prompting the car alarm to sound if electronic vehicle information window display device 200 is removed and the connection broken. In another example, a vehicle can transmit a signal, continuously or periodically, for example from a transmitter attached to an event data recorder (EDR) installed in the vehicle, to electronic vehicle information window display device 200, which can be configured to shut off without this signal.

In still another example, electronic display 230 of electronic vehicle information window display device 200 can be configured to show additional characteristics of a vehicle, such as a vehicle make, color, or type. In another instance, in response to a user reporting an electronic vehicle information window display device 200 stolen, a central authority (e.g., issuing entity 240) can send a signal to stop the device or sound an alarm (e.g., continuously) from the device, or an authority can search feed from existing traffic scanners or cameras at various locations to search for a vehicle with a device having a vehicle identifier matching the theft report.

In another embodiment, electronic vehicle information window display device 200 can be used to display vehicle information rather than, or in addition to, a government vehicle registration. For example, electronic vehicle information window display device 200 can display access information for parks, permit related parking areas, parking meters, day passes to an event, and so forth. In some cases, a windshield-mounted electronic vehicle information window display device 200 could display this access information in addition to a government vehicle registration. However, in many cases, an electronic vehicle information window display device 200 would need to be mounted on another part of a vehicle, such as a backseat window, because additional access information (e.g., a parking pass) is frequently not permitted to be displayed in a front windshield. Access information, and updates thereof, can be retrieved using the methods discussed above with reference to FIG. 4.

In addition, in some embodiments, access information displayed on an electronic vehicle information window display device 200 can be rotated on a set of time intervals. For example, electronic vehicle information window display device 200 could, based on a reading from clock 212 reaching a pre-specified threshold, display a parking lot permit during a pre-specified time period (e.g., regular business hours for a business parking lot) and then display a street parking permit during a different pre-specified time period (e.g., off-hours when a vehicle owner is at home). A vehicle user/owner may, for example, modify these time intervals or purchase additional permits or time intervals through a registration authority or an application on a device of the user. In still other embodiments, electronic vehicle information window display device 200 can receive display instructions from another device. For example, if a vehicle owner pays to enter a park, a device at a park attendant booth could transmit, for display, temporary permit information to electronic vehicle information window display device 200. This transmitted, temporary permit could be programmed to expire after a set period or at a specified time (e.g., the end of the day). In another embodiment, information stored on an electronic vehicle information window display device 200 can be temporarily displayed in response to a request from an outside device. For example, an authority, such as a police officer, may hold a signaling device in proximity to sensor 220 of electronic vehicle information window display device 200 to request or trigger, via a communications signal from the signaling device to sensor 220, electronic display 230 to display a particular information item or document, such as a registration followed by a proof of insurance.

Figure 5:
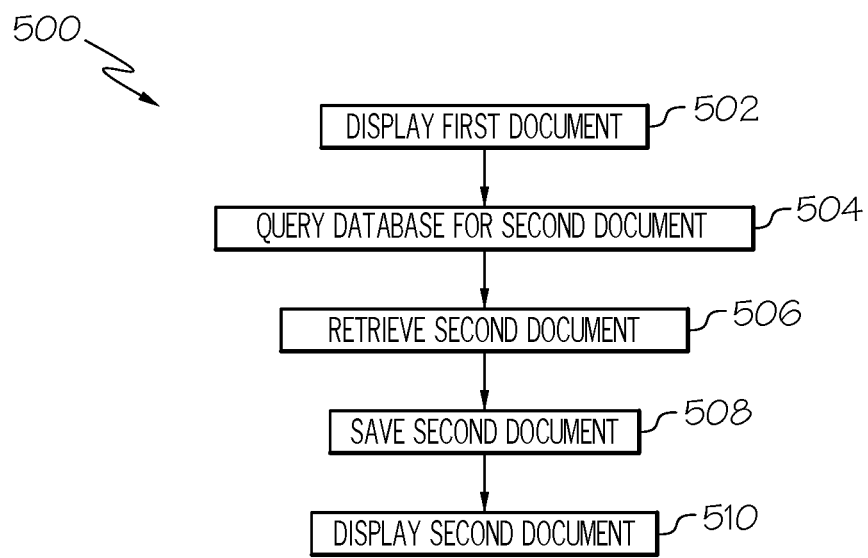
FIG. 5 shows another process flowchart for managing an electronic vehicle window display device according to illustrative embodiments.

As depicted in FIG. 5, in one embodiment, a system (e.g., computer system 12) carries out the methodologies disclosed herein. Shown is a process flowchart 500 for managing an electronic vehicle window display device. At step 502, programmable vehicle information display device 200 displays a first vehicle information document on display 230 of programmable vehicle window display device 200, the first vehicle information document having a first validity end date. At step 504, programmable vehicle information display device 200 queries vehicle information database 242 for a second vehicle information document having a second validity end date subsequent to the first validity end date. At step 506, programmable vehicle information display device 200 retrieves the second vehicle information document in response to the second validity end date being subsequent to the first validity end date. At step 508, programmable vehicle information display device 200 saves the second vehicle information document in storage 218 of programmable vehicle window display device 200. At step 510, programmable vehicle information display device 200 displays the second vehicle information document on display 230.

Process flowchart 500 of FIG. 5 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for managing an electronic vehicle window display device. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for managing an electronic vehicle window display device. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, such as a hardware storage device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to managing an electronic vehicle window display device. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method of managing a programmable vehicle window display device, the method comprising:
scheduling a display rotation of a plurality of documents stored on the programmable vehicle window display device based on a location schedule associated with a vehicle displaying the programmable vehicle window display device, the plurality of documents comprising at least a first type of document and a second type of document, wherein display of the second type of document is necessary for access to a location of the location schedule;

displaying, according to the scheduled display rotation, a first vehicle information document of the first type of document of the plurality of documents on a display of the programmable vehicle window display device, the first vehicle information document having a first validity end date;

querying a vehicle information database for a second vehicle information document of the first type of document having a second validity end date subsequent to the first validity end date;

retrieving, responsive to the second validity end date being subsequent to the first validity end date, the second vehicle information document;

saving the second vehicle information document in a storage area of the programmable vehicle window display device;

replacing the first vehicle information document of the first type of document of the plurality of documents with the second document in the scheduled display rotation;

displaying the second vehicle information document on the display according to the scheduled display rotation;

verifying, periodically, the second document with the vehicle information database;

invalidating the second document in the case of a verification failure; and displaying, responsive to the invalidation, an invalidation indicator on the display.

2. The method of claim 1, the querying further comprising submitting a query to the vehicle information database at a preset interval, the query comprising a vehicle identifier and the first validity end date.

3. The method of claim 1, the method further comprising displaying a notification on the display within a threshold time period prior to the first validity end date.

4. The method of claim 1, the method further comprising:
receiving a third vehicle information document;
saving the third vehicle information document in the storage area of the programmable vehicle window display device;
displaying on the display, daily at a first time period, the third vehicle information document; and
displaying on the display, daily at a second time period, the second vehicle information document.

5. The method of claim 1, the second information document being generated in response to a renewal of a permission granted by the first information document.

6. The method of claim 5, the first information document and the second information document being a same type of document, and the type of document being selected from the group consisting of: a registration document, a parking document, and an access document.

7. The method of claim 1, the display having a flexible screen and the programmable vehicle window display device having a mechanism for attachment to a vehicle window.

8. The method of claim 7, the programmable vehicle window display device having a mechanism to electronically invalidate the programmable vehicle window display device in the event of removal of the programmable vehicle window display device from a vehicle window.

9. A computer system for managing a programmable vehicle window display device, the computer system comprising:
the programmable vehicle window display device, comprising:
a memory medium comprising program instructions;
a bus coupled to the memory medium; and
a processor for executing the program instructions comprising a vehicle window display engine, the instructions causing the system to:
scheduling a display rotation of a plurality of documents stored on the programmable vehicle window display device based on a location schedule associated with a vehicle displaying the programmable vehicle window display device, the plurality of documents comprising at least a first type of document and a second type of document, wherein display of the second type of document is necessary for access to a location of the location schedule;
display, according to the scheduled display rotation, a first vehicle information document of the first type of document of the plurality of documents on a display of the programmable vehicle window display device, the first vehicle information document having a first validity end date;
query a vehicle information database for a second vehicle information document of the first type of document having a second validity end date subsequent to the first validity end date;
retrieve, responsive to the second validity end date being subsequent to the first validity end date, the second vehicle information document;
save the second vehicle information document in a storage area of the programmable vehicle window display device;
replace the first vehicle information document of the first type of document of the plurality of documents with the second document in the scheduled display rotation;
display the second vehicle information document on the display according to the scheduled display rotation;
verify, periodically, the second document with the vehicle information database;
invalidate the second document in the case of a verification failure; and
display, responsive to the invalidation, an invalidation indicator on the display.

10. The computer system of claim 9, the instructions further causing the system to submit a query to the vehicle information database at a preset interval, the query comprising a vehicle identifier and the first validity end date.

11. The computer system of claim 9, the instructions further causing the system to display a notification on the display within a threshold time period prior to the first validity end date.

12. The computer system of claim 9, the instructions further causing the system to:
receive a third vehicle information document;
save the third vehicle information document in the storage area of the programmable vehicle window display device;
display on the display, daily at a first time period, the third vehicle information document; and
displaying on the display, daily at a second time period, the second vehicle information document.

13. The computer system of claim 9, the second information document being generated in response to a renewal of a permission granted by the first information document.

14. The computer system of claim 13, the first information document and the second information document being a same type of document, and the type of document being selected from the group consisting of: a registration document, a parking document, and an access document.

15. The computer system of claim 9, the display having a flexible screen and the programmable vehicle window display device having a mechanism for attachment to a vehicle window.

16. The computer system of claim 15, the programmable vehicle window display device having a mechanism to electronically invalidate the programmable vehicle window display device in the event of removal of the programmable vehicle window display device from a vehicle window.

17. A computer program product for managing a programmable vehicle window display device, the computer program product comprising a computer readable hardware storage device, and program instructions stored on the computer readable hardware storage device, to:
schedule a display rotation of a plurality of documents stored on the programmable vehicle window display device based on a location schedule associated with a vehicle displaying the programmable vehicle window display device, the plurality of documents comprising at least a first type of document and a second type of document, wherein display of the second type of document is necessary for access to a location of the location schedule;
display, according to the scheduled display rotation, a first vehicle information document of the first type of document of the plurality of documents on a display of the programmable vehicle window display device, the first vehicle information document having a first validity end date;
query a vehicle information database for a second vehicle information document of the first type of document having a second validity end date subsequent to the first validity end date;
retrieve, responsive to the second validity end date being subsequent to the first validity end date, the second vehicle information document;
save the second vehicle information document in a storage area of the programmable vehicle window display device;
replace the first vehicle information document of the first type of document of the plurality of documents with the second document in the scheduled display rotation;
display the second vehicle information document on the display according to the scheduled display rotation;
verify, periodically, the second document with the vehicle information database;
invalidate the second document in the case of a verification failure; and
display, responsive to the invalidation, an invalidation indicator on the display.

18. The computer program product of claim 17, the computer readable storage device further comprising instructions to submit a query to the vehicle information database at a preset interval, the query comprising a vehicle identifier and the first validity end date.

19. The computer program product of claim 17, the computer readable storage device further comprising instructions to display a notification on the display within a threshold time period prior to the first validity end date.

20. The computer program product of claim 17, the second information document being generated in response to a renewal of a permission granted by the first information document, the first information document and the second information document being a same type of document, and the type of document being selected from the group consisting of: a registration document, a parking document, and an access document.

* * * * *